United States Patent
Ryou et al.

(10) Patent No.: US 10,461,295 B2
(45) Date of Patent: Oct. 29, 2019

(54) SEPARATOR CAPABLE OF SELECTIVE ION MIGRATION, AND SECONDARY BATTERY COMPRISING SAME

(71) Applicant: REKRIX CO., LTD., Seoul (KR)

(72) Inventors: Byoung Hoon Ryou, Seoul (KR); Jae Kyung Kong, Seoul (KR)

(73) Assignee: REKRIX CO., LTD., Seoul (KR)

( * ) Notice: Subject to any disclaimer, the term of this patent is extended or adjusted under 35 U.S.C. 154(b) by 37 days.

(21) Appl. No.: 15/573,553

(22) PCT Filed: May 9, 2016

(86) PCT No.: PCT/KR2016/004814
§ 371 (c)(1),
(2) Date: Nov. 13, 2017

(87) PCT Pub. No.: WO2016/195263
PCT Pub. Date: Dec. 8, 2016

(65) Prior Publication Data
US 2018/0151861 A1   May 31, 2018

(30) Foreign Application Priority Data
May 29, 2015  (KR) .................. 10-2015-0076060

(51) Int. Cl.
*H01M 2/16* (2006.01)
*H01M 2/18* (2006.01)
(Continued)

(52) U.S. Cl.
CPC ......... *H01M 2/1653* (2013.01); *H01M 2/145* (2013.01); *H01M 2/1686* (2013.01);
(Continued)

(58) Field of Classification Search
None
See application file for complete search history.

(56) References Cited

U.S. PATENT DOCUMENTS

| 8,048,567 B2 | 11/2011 | Kim et al. | |
| 2001/0028976 A1* | 10/2001 | Treger | H01M 2/145 429/56 |

(Continued)

FOREIGN PATENT DOCUMENTS

| CN | 102496485 A | 6/2012 |
| JP | H2-79363 A | 3/1990 |

(Continued)

OTHER PUBLICATIONS

Lee, Y. M., et al., "Electrochemical Effect of Coating Layer on the Separator Based on PVdF and PE Non-Woven Matrix," Journal of Power Sources 146 (Jun. 2005), 431-435.*

(Continued)

*Primary Examiner* — Jonathan Crepeau
(74) *Attorney, Agent, or Firm* — The PL Law Group, PLLC

(57) ABSTRACT

A separator includes a support formed in a grid, and a porous ion migration inhibition layer with which the grid of the support is coated and which has a plurality of pores formed therein, wherein each of the plurality of pores of the porous ion migration inhibition layer is formed to have a size smaller than the size of an electromigration-promoting ion contained in an electrolyte, whereby the electromigration-promoting ion does not pass through the porous ion migration inhibition layer. In addition, potassium is prevented from migrating to the carbon layer, thereby preventing potassium hydroxide from being precipitated even when oxygen is moved to a positive electrode side during charging. Furthermore, when the separator is applied to a separator of an alkaline battery, potassium hydroxide may be prevented from being precipitated during charging, thereby achieving an effect that an alkaline primary battery can be used as a secondary battery.

6 Claims, 2 Drawing Sheets

(51) Int. Cl.
  *H01M 12/08*  (2006.01)
  *H01M 2/14*  (2006.01)
  *H01M 10/02*  (2006.01)

(52) U.S. Cl.
  CPC ............ *H01M 2/18* (2013.01); *H01M 10/02* (2013.01); *H01M 12/08* (2013.01)

(56) References Cited

U.S. PATENT DOCUMENTS

| | | | |
|---|---|---|---|
| 2014/0272569 A1* | 9/2014 | Cai | H01M 2/145 429/213 |
| 2015/0104690 A1* | 4/2015 | Xiao | H01M 2/145 429/145 |
| 2016/0204473 A1* | 7/2016 | Lindstrom | H01M 4/382 429/162 |

FOREIGN PATENT DOCUMENTS

| | | |
|---|---|---|
| JP | 3279091 B2 | 4/2002 |
| JP | 2013-222090 A | 10/2013 |
| KR | 10-2008-0059137 A | 6/2008 |
| KR | 10-2013-0018511 A | 2/2013 |
| KR | 10-2013-0117337 A | 10/2013 |
| KR | 10-2015-0054394 A | 5/2015 |
| WO | WO 2014/091856 A1 | 6/2014 |
| WO | WO 2014/092107 A1 | 6/2014 |

OTHER PUBLICATIONS

International Search Report for PCT/KR2016/004814, dated Sep. 12, 2016.
European Search Report for EP 16803618.4 dated Jan. 9, 2019 from European patent office in a counterpart European patent application.
Office action dated Jan. 8, 2019 from Japan Intellectual Property Office in a counterpart Japanese Patent Application No. 2017-559550 (all the cited references are listed in this IDS.) (English translation is also submitted herewith.).

* cited by examiner

SEPARATOR CAPABLE OF SELECTIVE ION MIGRATION, AND SECONDARY BATTERY COMPRISING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/004814, filed May 9, 2016, which claims priority to the benefit of Korean Patent Application No. 10-2015-0076060 filed in the Korean Intellectual Property Office on May 29, 2015, the entire contents of which are incorporated herein by reference.

TECHNICAL FIELD

The present invention relates to a separator capable of selective ion migration and a secondary battery including the same, and more specifically, to a separator capable of selective ion migration in which each of a plurality of pores of a porous ion migration inhibition layer is formed so as to have a size smaller than the size of an electromigration-promoting ion contained in an electrolyte, and thus the electromigration-promoting ion is prevented from passing through the porous ion migration inhibition layer, and a secondary battery including the same.

BACKGROUND ART

Generally, a battery is assembled by a negative electrode, a positive electrode, and a separator interposed therebetween. Here, the separator positioned between the two electrodes of the battery is a subsidiary material which prevents the negative electrode and the positive electrode from being in direct contact with each other to prevent an internal short-circuit, and plays an important role not only as an ion passage in the battery but also in improving the safety of the battery.

FIG. 1 is a view showing a general structure of a zinc-air battery.

The zinc-air battery includes a positive electrode, a separator 40, an electrolyte 50 and a negative electrode.

First, the positive electrode includes a carbon layer 20, a positive electrode current collector 30 in a metal mesh form formed in the interior of the carbon layer 20, and a Teflon layer 10 formed on the upper part of the carbon layer 20.

Further, the separator 40 is disposed at the lower part of the carbon layer 20, and a negative electrode current collector 60 of the negative electrode is formed apart from the separator 40 at a predetermined distance.

The electrolyte 50 is formed as a slurry in which zinc (Zn), potassium hydroxide (KOH) and water ($H_2O$) are mixed, and accommodated between the separator 40 and the negative electrode current collector 60. Here, the electrolyte 50 passes through the separator 40 capable of selective ion migration and impregnates a part of the carbon layer 20 to form a gas-liquid interface 21.

The zinc-air battery formed as above operates by the migration of electrons generated when zinc contained in the electrolyte 50 reacts with oxygen in the air and is changed into zinc oxide.

In the conventional zinc-air battery as described above, the electrolyte 50 impregnates a part of the carbon layer 20 through a plurality of pores of the separator 40, and potassium hydroxide contained in the electrolyte 50 reacts with oxygen in the air and is precipitated. As a result, the carbon layer 20 is destroyed and the performance of the zinc-air battery is deteriorated.

Further, when the zinc-air battery is charged, oxygen migrates to the positive electrode side, and the oxygen migrated to the positive electrode side reacts with potassium hydroxide such that potassium hydroxide is precipitated, and thus it is difficult to use the zinc-air battery as a secondary battery.

The present invention is designed to solve the aforementioned problems, and it is an object of the present invention to provide a separator capable of selective ion migration in which each of a plurality of pores of a porous ion migration inhibition layer is formed so as to have a size smaller than the size of an electromigration-promoting ion contained in an electrolyte, and thus the electromigration-promoting ion is prevented from passing through the porous ion migration inhibition layer, and a secondary battery including the same.

According to an aspect of the present invention, there is provided a separator capable of selective ion migration, including: a support formed in a grid; and a porous ion migration inhibition layer with which the grid of the support is coated and which has a plurality of pores formed therein, where each of the plurality of pores of the porous ion migration inhibition layer is formed so as to have a size smaller than the size of an electromigration-promoting ion contained in an electrolyte, and thus the electromigration-promoting ion is prevented from passing through the porous ion migration inhibition layer.

Here, the support may be formed of polyvinyl alcohol (PVA), and the porous ion migration inhibition layer is formed of polyvinyl acetate (PVAc).

The porous ion migration inhibition layer may be formed by an electrospinning process of electrically charging polyvinyl acetate (PVAc) and spinning the polyvinyl acetate (PVAc) onto the support.

Further, the porous ion migration inhibition layer may be formed by substituting polyvinyl acetate (PVAc) with at least one alkali metal or alkaline earth metal.

Further, according to another aspect of the present invention, there is provided a secondary battery, including: a positive electrode; a negative electrode; a separator interposed between the positive electrode and the negative electrode; and an electrolyte for partially impregnating the negative electrode, the separator and the positive electrode, where the separator is formed of a porous material having a plurality of pores formed therein, and each of the plurality of pores of the porous ion migration inhibition layer is formed so as to have a size smaller than the size of an electromigration-promoting ion contained in an electrolyte, and thus the electromigration-promoting ion is prevented from passing through the porous ion migration inhibition layer and migrating to the positive electrode side.

Accordingly, the present invention has the following effects.

First, the performance of a zinc-air battery can be prevented from being degraded in a manner whereby a plurality of pores in the porous ion migration inhibition layer of the separator are formed so as to have a size smaller than the size of potassium ions contained in an electrolyte, thereby preventing the potassium ions from migrating to a carbon layer to fundamentally prevent potassium hydroxide from being precipitated, whereby the carbon layer is destroyed.

Second, a zinc-air battery can be used as a secondary battery in a manner whereby potassium is prevented from migrating to the carbon layer, thereby preventing potassium hydroxide from being precipitated even when oxygen is moved to a positive electrode side during charging of the zinc-air battery.

Third, when the present invention is applied to a separator of an alkaline battery, it is possible to prevent potassium hydroxide from being precipitated during charging, thereby achieving an effect that an alkaline primary battery can be used as a secondary battery.

DETAILED DESCRIPTION

Terms or words used in this specification and claims should not be restrictively interpreted as ordinary meanings or dictionary-based meanings, but should be interpreted as meanings and concepts conforming to the technical ideas of the present invention on the basis of the principle that an inventor can properly define the concept of a term to describe and explain his or her invention in the best way.

Accordingly, embodiments and structures illustrated herein are suggested only by way of example but do not represent all technical concepts of the present invention. Therefore, it will be understood that various equivalents and modifications may exist which can replace the embodiments described at the time of the application. Moreover, detailed descriptions related to well-known functions or configurations will be omitted in order to not unnecessarily obscure the subject matter of the present invention.

Figure 1:
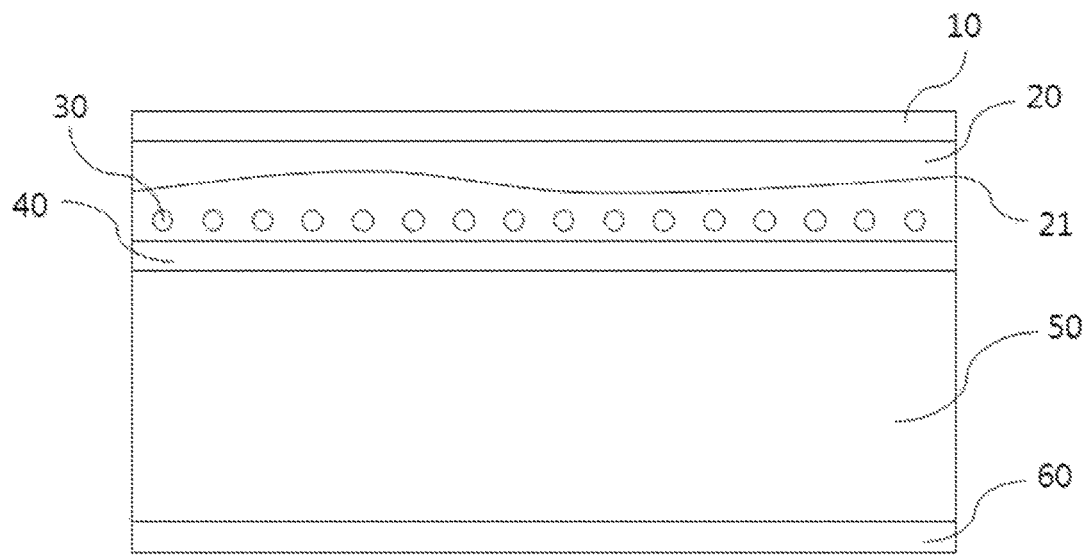
FIG. 1 is a view showing a general structure of a zinc-air battery.
Figure 2:
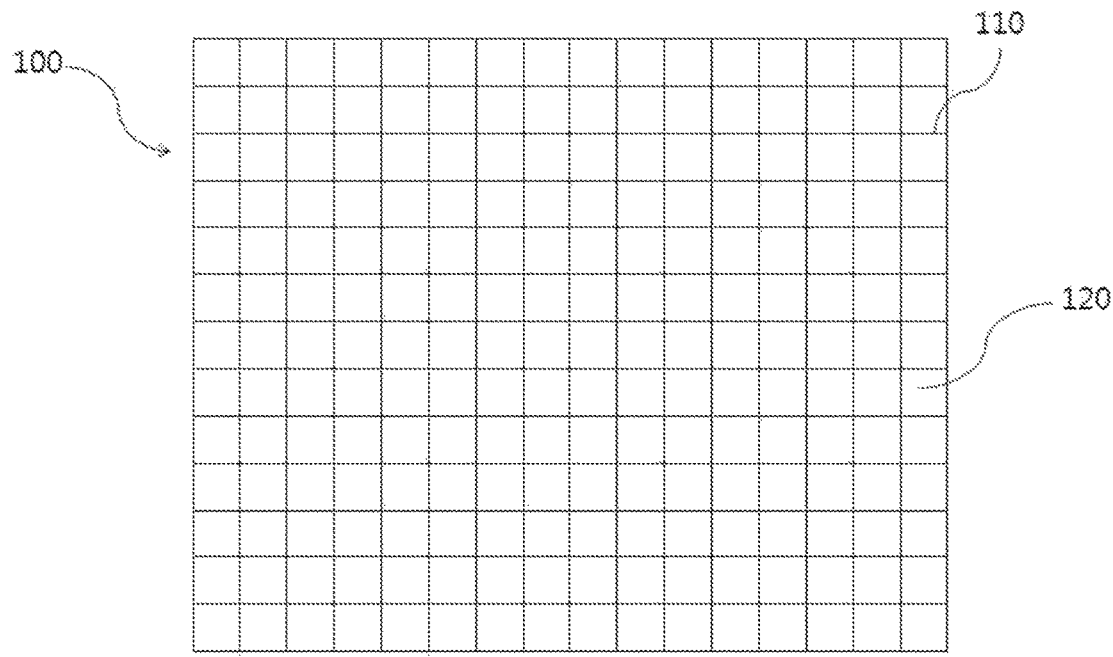
FIG. 2 is a view showing a separator capable of selective ion migration according to the present invention.

Hereinafter, a separator capable of selective ion migration and a secondary battery including the separator according to an exemplary embodiment of the present invention will be described with reference to accompanying drawings As shown in FIG. 2, a separator 100 capable of selective ion migration according to the present invention includes a support 110 formed in a grid, and a porous ion migration inhibition layer 120 with which the grid of the support is coated and which has a plurality of pores formed therein.

First, the support 110 is a sheet formed in a grid prepared by curing polyvinyl alcohol (PVA). Polyvinyl alcohol (PVA) is a polymer compound and a colorless powder obtained by hydrolyzing polyvinyl acetate, and has a property of not being wetted with water when cured.

In the present embodiment, the support 110 is formed of polyvinyl alcohol (PVA), but is not limited thereto, and may be formed of any material which does not become wet with water.

Further, the porous ion migration inhibition layer 120 is formed by electrically charging polyvinyl acetate (PVAc) and spinning the polyvinyl acetate (PVAc) onto the grid of the support 110. That is, the porous ion migration inhibition layer 120 is formed by an electrospinning process. When the porous ion migration inhibition layer 120 is formed by spinning polyvinyl acetate (PVAc) onto the support 110 through the electrospinning process as described above, a plurality of pores are formed in the porous ion migration inhibition layer 120, and the size of the pores is formed to be smaller than the size of potassium ions. Accordingly, it is not possible for the potassium ions to migrate to the carbon layer, thereby preventing potassium hydroxide from being precipitated.

Further, the porous ion migration inhibition layer 120 may be formed by substituting polyvinyl acetate (PVAc) with at least one alkali metal or alkaline earth metal.

When hydrogen of a methyl group of radicals connected to the backbone of polyvinyl acetate (PVAc) is substituted with at least one alkali metal or alkaline earth metal, potassium ions are prevented from passing through the porous ion migration inhibition layer 120 in terms of the chemical structure. In this case, the same effect as the effect of forming polyvinyl acetate (PVAc) by the electrospinning process can also be achieved.

Figure 3:
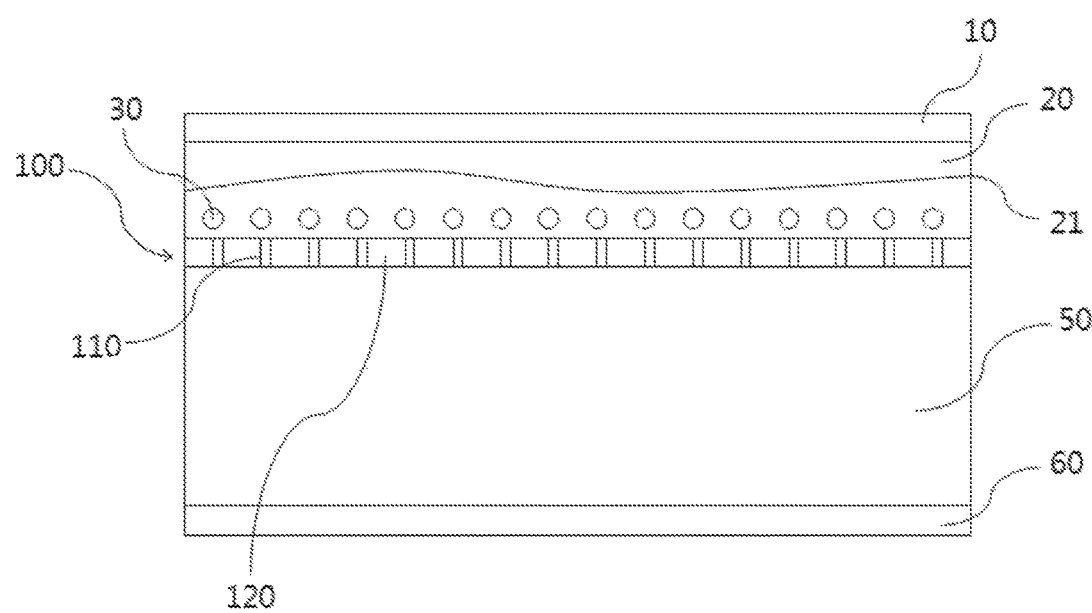
FIG. 3 is a view showing a structure of a secondary battery including the separator capable of selective ion migration according to the present invention.

Hereinafter, a secondary battery according to the present invention will be described with reference to FIG. 3.

The secondary battery according to the present invention includes a positive electrode, a separator 100, an electrolyte 50 and a negative electrode.

First, the positive electrode includes a carbon layer 20, a positive electrode current collector 30 in a metal mesh form formed in the interior of the carbon layer 20, and a Teflon layer 10 formed on the upper part of the carbon layer 20.

Further, the separator 100 capable of selective ion migration is disposed at the lower part of the carbon layer 20, and a negative electrode current collector 60 of the negative electrode is formed a predetermined distance apart from the separator 100 capable of selective ion migration.

The electrolyte 50 is formed as a slurry in which zinc (Zn), potassium hydroxide (KOH) and water ($H_2O$) are mixed, and accommodated between the separator 100 and the negative electrode current collector 60. Here, the electrolyte 50 passes through the separator 100 capable of selective ion migration and impregnates a part of the carbon layer 20 to form a gas-liquid interface 21.

In the secondary battery according to the present invention, potassium ions are prevented from migrating to the carbon layer 20 by the porous ion migration inhibition layer 120 of the separator 100 capable of selective ion migration to fundamentally prevent potassium hydroxide from being precipitated, thereby preventing the performance of the secondary battery from being degraded.

Further, a zinc-air battery can be used as a secondary battery in a manner whereby potassium is prevented from migrating to the carbon layer, thereby preventing potassium hydroxide from being precipitated even when oxygen is moved to a positive electrode side during charging of the zinc-air battery.

Further, when the separator 100 capable of selective ion migration of the present invention is applied to an alkaline battery, it is possible to prevent potassium ions from migrating to a positive electrode side of the alkaline battery to prevent potassium hydroxide from being precipitated even when oxygen migrates to the positive electrode side during charging, thereby achieving an excellent effect that the alkaline primary battery can be used as a secondary battery.

Heretofore, the exemplary embodiment with respect to the separator capable of selective ion migration and the secondary battery including the separator according to the present invention has been described as an example.

The above-described embodiments are illustrative and non-limiting in all respects, so it is to be understood that the scope of the present invention will be defined by the appended claims rather than the foregoing description and the exemplary embodiments described therein. All changes and modifications made within the spirit and scope of the claims of the invention, as well as equivalents thereof, are to be regarded as being included within the scope of the present invention.

The invention claimed is:

1. A zinc-air battery, comprising:
a positive electrode comprising a carbon layer and a positive electrode current collector in a metal mesh form formed in the interior of the carbon layer;
a negative electrode;
a separator capable of selective ion migration, the separator interposed between the positive electrode and the negative electrode, the separator comprising:
a support formed in a grid; and
a porous ion migration inhibition layer with which the grid of the support is coated and which has a plurality of pores formed therein, wherein each of the plurality of pores of the porous ion migration inhibition layer is formed so as to have a size smaller than the size of an electromigration-promoting ion contained in an electrolyte, and thus the electromigration-promoting ion is prevented from passing through the porous ion migration inhibition layer; and
the electrolyte for impregnating the negative electrode, the separator, and a part of the positive electrode, the electrolyte comprising a slurry in which zinc (Zn), potassium hydroxide (KOH) and water ($H_2O$) are mixed; and
a gas-liquid interface formed by impregnating a part of the carbon layer with the electrolyte of which ions selectively passing through the separator due to the size of the pores,
wherein the zinc-air battery operates by a migration of electrons generated when zinc contained in the electrolyte reacts with oxygen in the air and is changed into zinc oxide.

2. The zinc-air battery according to claim 1, wherein the support is formed of polyvinyl alcohol (PVA), and the porous ion migration inhibition layer is formed of polyvinyl acetate (PVAc).

3. The zinc-air battery according to claim 2, wherein the porous ion migration inhibition layer is formed by an electrospinning process of electrically charging polyvinyl acetate (PVAc) and spinning the polyvinyl acetate (PVAc) onto the support.

4. The zinc-air battery according to claim 2, wherein the porous ion migration inhibition layer is formed by substituting a hydrogen of a methyl group connected to a backbone of polyvinyl acetate (PVAc) with at least one alkali metal or alkaline earth metal.

5. A zinc-air battery, comprising:
a positive electrode;
a negative electrode;
a separator interposed between the positive electrode and the negative electrode; and
an electrolyte including zinc for impregnating the negative electrode, the separator and a part of the positive electrode, the electrolyte comprising an electromigration-promoting ion,
wherein the separator is formed of a porous material having a plurality of pores formed therein, and each of the plurality of pores has a size smaller than the size of an electromigration-promoting ion contained in the electrolyte, and thus the electromigration-promoting ion does not pass through the plurality of pores such that the electromigration-promoting ion is prevented from migrating to the positive electrode side,
wherein the zinc-air battery operates by a migration of electrons generated when zinc contained in the electrolyte reacts with oxygen in the air and is changed into zinc oxide.

6. The zinc-air battery of claim 5, wherein the electrolyte comprises a slurry in which zinc (Zn), potassium hydroxide (KOH) and water ($H_2O$) are mixed, and said each of the plurality of pores of the porous ion migration inhibition layer has a size smaller than the size of a potassium ion.

* * * * *